April 21, 1925.

J. F. JANSSEN

WINDSHIELD HOLDER

Filed July 3, 1923

1,534,392

Inventor
Jean Bernand Janssen
by B. Singer
atty

Patented Apr. 21, 1925.

1,534,392

UNITED STATES PATENT OFFICE.

JEAN FERNAND JANSSEN, OF LEVALLOIS-PERRET, FRANCE.

WINDSHIELD HOLDER.

Application filed July 3, 1923. Serial No. 649,317.

*To all whom it may concern:*

Be it known that I, JEAN FERNAND JANSSEN, a citizen of France, and a resident of Levallois-Perret, in the Department de la Seine, France, have invented some new and useful Improvements in Windshield Holders, of which the following is a specification.

This invention relates to improvements in automobile bodies and especially with respect to the mounting of the standard or windshield frame, the object of the invention being to provide an improved automobile body having a front or cowl portion and a standard or windshield frame mounted for vibration independently of each other to prevent the deformation of the front part of the chassis and also of the rear part thereof as results when the cowl and the windshield or standard frame are rigidly connected together and to the chassis.

With the above and other objects in view the invention consists in the construction, combination and arrangement of devices hereinafter described and claimed.

In the accompanying drawings—

Figure 1:
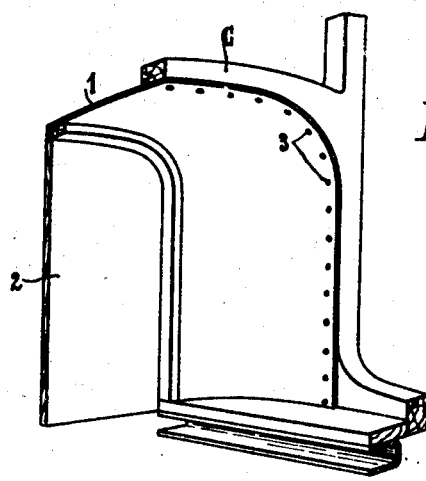
Figure 1 is a sectional perspective showing the windshield frame and cowl of an automobile body rigidly secured together as has heretofore been the usual practice.
Figure 3:
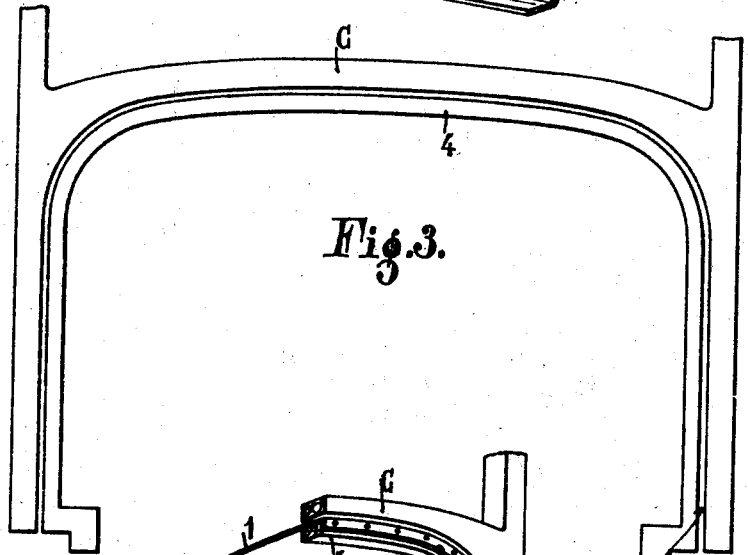
Figure 3 is an elevation of the windshield frame and of the cowl so mounted.
Figure 2:
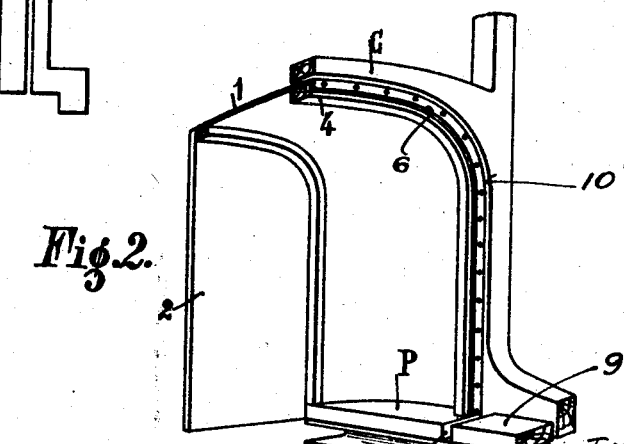
Figure 2 is a similar view showing the standard or windshield frame and cowl of an automobile body mounted for vibration independently of and disconnected from each other in accordance with my invention.

In accordance with my invention I provide the cowl 1 and front portion of an automobile body immediately in rear of the dash 2 with a reenforcing hoop or arch bar 4 which is secured thereto at the rear side thereof, preferably by providing the cowl with an inwardly turned flange 6 which bears against the rear side of said hook and is secured thereto as by means of screws or other fastening devices 7. This cowl has its lintels P arranged directly on and secured to the chassis 8 as shown in Figure 2, the cowl lintels P being spaced, as at 5, from the lintels 9 of the main portion of the automobile body or tonneau of the standard or windshield frame C. It will be observed upon reference to Figures 2 and 3 of the drawing that the cowl 1 is spaced under the arched portion of the frame C and also from the side or standard portions thereof as at 10 and hence the cowl is disconnected from and is free to vibrate independently of the standard of windshield frame 1. An automobile body constructed in accordance with my invention is not subjected to uneven stresses at its front and rear ends incident to vibration and hence is very much less likely to become misshapen as the result of such stresses as the shed and windshield or standard frame are free to move or vibrate independently of each other and stress applied to one of them is confined thereto and not communicated to other parts of the automobile body.

Having thus described my invention, I claim:

1. In an automobile, a chassis, a standard or windshield frame mounted thereon, and a cowl also mounted on the chassis and disconnected from and free to vibrate independently of the standard frame.

2. In an automobile, a chassis, a standard or windshield frame mounted thereon, and a cowl also mounted on the chassis and disconnected and spaced from the standards and arched portion of the standard or windshield frame.

In witness whereof I affix my signature.

JEAN FERNAND JANSSEN.